N. JOHNSON.
Improvement in Saws.
No. 133,036.  Patented Nov. 12, 1872.
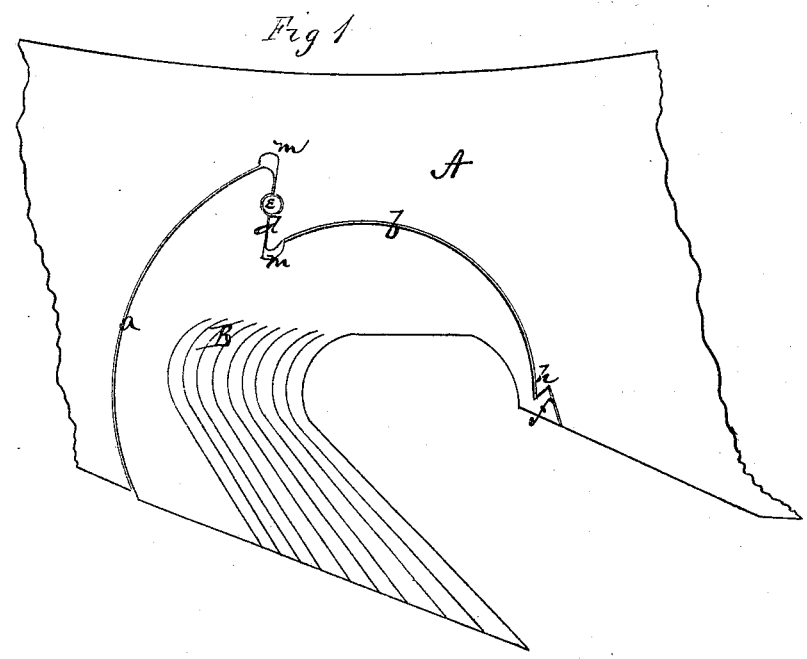
Witnesses
Franck L. Durand
C. L. Evert
Inventor
Nelson Johnson
per
Alexander Mason
Attorneys.

UNITED STATES PATENT OFFICE.

NELSON JOHNSON, OF JASPER, NEW YORK.

IMPROVEMENT IN SAWS.

Specification forming part of Letters Patent No. 133,036, dated November 12, 1872.

*To all whom it may concern:*

Be it known that I, NELSON JOHNSON, of Jasper, in the county of Steuben and in the State of New York, have invented certain new and useful Improvements in Saws; and do hereby declare that the following is a full, clear, and exact description thereof, reference being had to the accompanying drawing and to the letters of reference marked thereon making a part of this specification.

The nature of my invention consists in the construction and arrangement of a circular-saw tooth with two or more circles, and in the mode of fastening the same to the saw-plate, as will be hereinafter more fully set forth.

In order to enable others skilled in the art to which my invention appertains to make and use the same, I will now proceed to describe its construction and operation, referring to the annexed drawing, in which—

Figure 1 represents a side view of the saw-tooth and mode of fastening.

A represents the plate of a circular saw, and B a tooth inserted in the same. Each tooth is formed with two or more circles, *a* and *b*, having the same center, the back circle *a* having a larger radius than the circle *b*, and the edges grooved in the usual manner, the edges of the recess in the plate for receiving the tooth being V-shaped to fit in said grooves. *d* represents a jog or notch between the two circles *a* and *b*, and a rivet, *e*, is inserted, one-half in the tooth and the other half in the plate, to prevent the tooth from swinging in the circle; and this rivet being placed nearly opposite and at right angles with the point of the saw-tooth, it will also hold the tooth from turning out of the circles, and will not strain the saw. *f* represents a spring-catch formed in or attached to the inner end of the saw-tooth to spring over and catch on a notch, *h*, in the saw-plate, and thereby hold the saw firmly in place. This spring-catch may either be formed with the tooth, as shown in Fig. 1, or made separate and attached to the tooth. By making the circle at the back larger, as above described, the wearing-surface is increased to a considerable extent. All the corners in the rear edge of the tooth, as well as in the corresponding recess of the plate, are rounded and enlarged, as shown at *m m*, thereby enabling the workman to clip off the ends without injuring or breaking his tools, and also preventing the strain from breaking the tooth at these points.

By my mode of fastening the saw-teeth they are prevented from turning out of the circle in the saw-plate, if the saw from any cause should be turned backward while it is in the cut. It is frequently the case when lumber springs and shuts up on to the saw and stops it, that the carriage has to be moved backward while the saw is standing to get it out of the cut, and in such case many of the teeth are turned out of the plate. This cannot occur with my construction of the saw-teeth, as they cannot be driven round in the circle while the saw is running in the cut.

Having thus fully described my invention, what I claim as new, and desire to secure by Letters Patent, is—

The combination of the plate A with the notch *h* at the forward end of the circle *b* with the tooth B, with the spring projection *f*, all as shown, and for the purposes set forth.

In testimony that I claim the foregoing I have hereunto set my hand this 19th day of March, 1872.

NELSON JOHNSON.

Witnesses:
  C. L. EVERT,
  J. M. MASON.